United States Patent [19]

Duda

[11] Patent Number: 4,498,012
[45] Date of Patent: Feb. 5, 1985

[54] ABSOLUTE RADIOMETRIC DETECTOR

[75] Inventor: C. Richard Duda, El Segundo, Calif.

[73] Assignee: United Detector Technology, Hawthorne, Calif.

[21] Appl. No.: 463,258

[22] Filed: Feb. 2, 1983

[51] Int. Cl.³ .............................................. G01J 1/42
[52] U.S. Cl. .................................... 250/578; 356/222
[58] Field of Search ................... 250/578, 216, 211 R; 356/215, 222, 223, 225, 226, 229, 230, 234, 236

[56] References Cited

U.S. PATENT DOCUMENTS 3,622,245 11/1971 Rasmussen ...................... 356/234 X
4,242,581 12/1980 Crow ............................... 356/222 X Primary Examiner—Edward P. Westin
Attorney, Agent, or Firm—Thomas E. Schatzel

[57] ABSTRACT

A visible spectrum radiation measuring apparatus achieving an absolute measurement utilizing a plurality of inversion layer silicon photodiodes in a configuration wherein light reflected from the surface of a photodiode impinges on another photodiode, and its respective reflected light impinges on another photodiode, such that each time the light impinges on a photodiode surface a portion is absorbed, and that ultimately most of the light of the beam being measured is absorbed.

8 Claims, 4 Drawing Figures

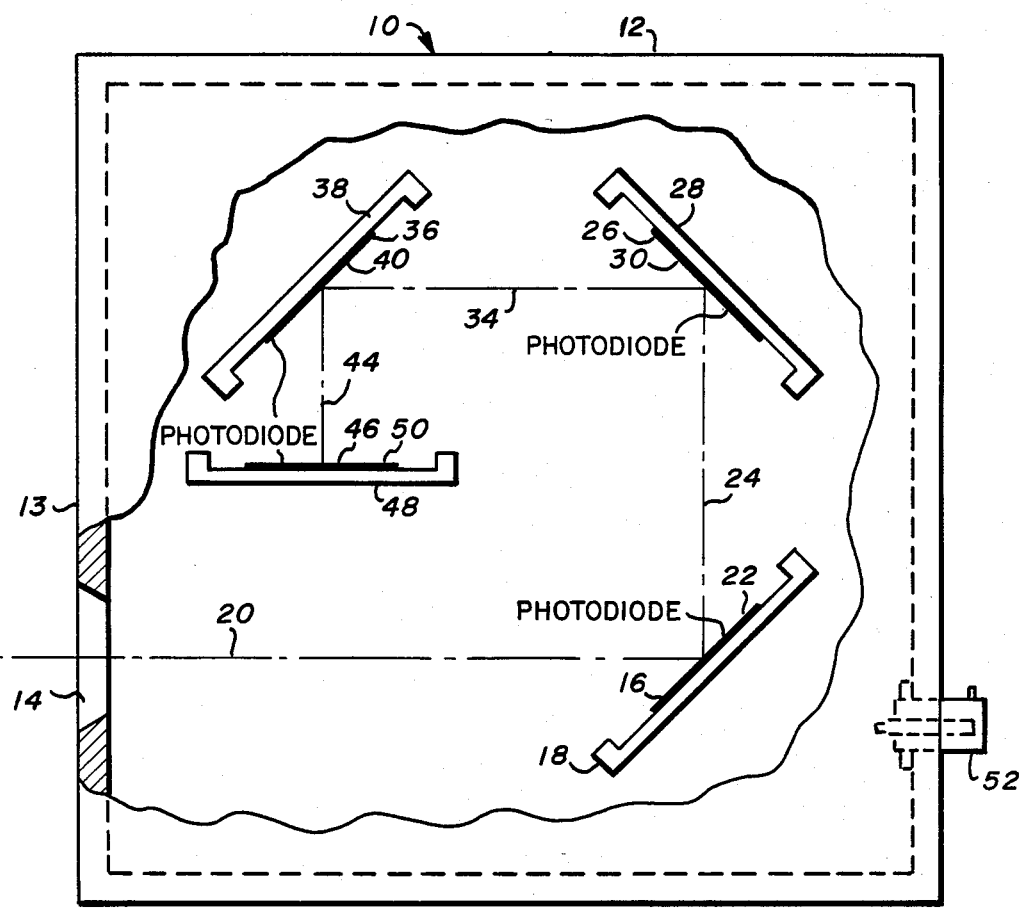
Fig_1
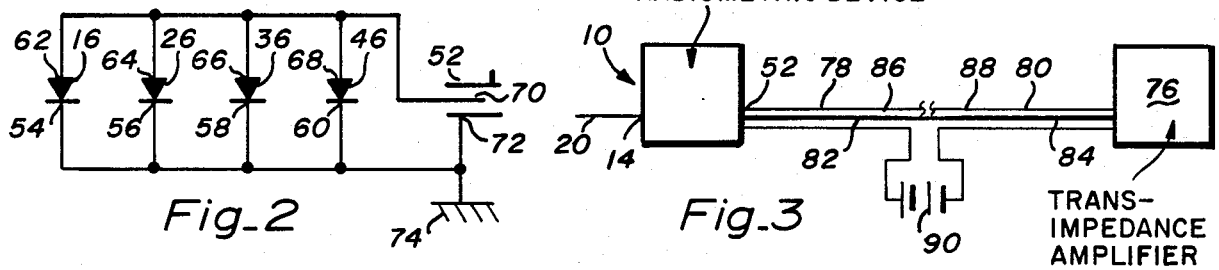
Fig_2    Fig_3
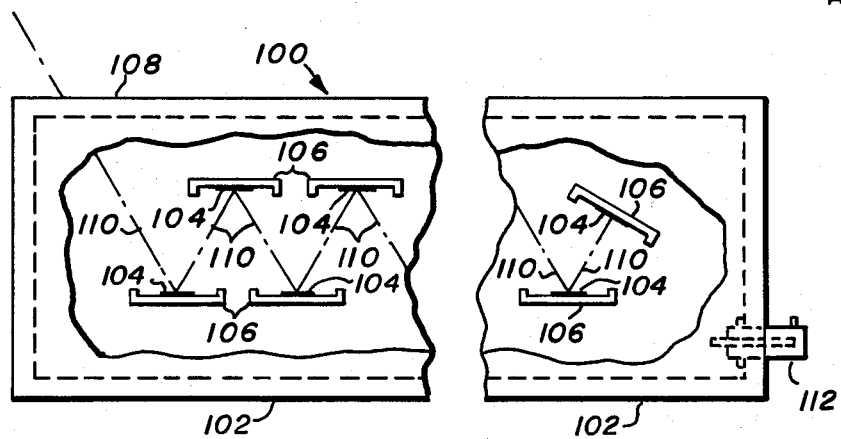
Fig_4

ABSOLUTE RADIOMETRIC DETECTOR

BACKGROUND OF THE INVENTION

1. Field of the Invention

The invention relates generally to radiometric devices, and more particularly to devices which provide for radiant flux measurement of visible spectrum radiation through utilization of a response characteristic that allows an absolute measurement.

2. Description of the Prior Art

Radiometric devices producing measurements responsive to the radiant flux impinging thereon have long been available for measurement of light beams such as laser beams. These devices fall into one of two categories. One category includes absolute measuring devices, for which the relationship between the radiant flux of the light beam and the indicated measurement is based on fixed physical constants, and thus constitute primary measuring devices. The other category generates responses merely related to the radiant flux of the light beam by empirical data, and must be calibrated. Such devices are calibrated against primary measuring devices (absolute measuring devices) and are referred to as secondary measuring devices.

Absolute measuring devices for determining radiant flux have tended to be complicated and expensive, and involve physical constants such as the freezing point of platinum. Until a few years ago, the idea of using photodiodes as the sensing mechanism for an absolute radiometric device appeared unrealistic. An absolute response in photodiodes is possible, in that one photon will release one electron-hole pair in a silicon photodiode. But conventional photodiodes exhibited properties influenced by recombination of electrons and holes within its structure. The consequence of such recombination is that the actual charge flow through the photodiode is not related simply to the photons absorbed by the photodiode, but is also influenced by the recombination rate. The effect of such recombination is that the actual current flow external to the photodiode in response to the radiant flux absorbed by the photodiode is less than the theoretical current which would flow if one electron-hole pair were released for each photon absorbed by the photodiode. The ratio of the actual current flow to the theoretical current flow, if one electron-hole pair were released for every photon absorbed by the photodiode, is referred to as the internal quantum efficiency of the photodiode.

An additional problem with attempting to utilize silicon photodiodes in an absolute radiometric device is the reflection of light from the surface of the photodiodes. Although special processes involving nonreflective oxides reduce the reflective nature of the silicon, a reflective coefficient of 0.25 is still typical. The effect of such reflection of light is that the number of electrons released as a result of the absorbtion of photons is smaller than the number of photons which impinge upon the surface of the photodiode. The ratio of number of photons absorbed by the photodiode to the total number of photons impinging on the surface of the photodiode is referred to as the external quantum efficiency.

The consequence of these two sources of inefficiency is that a correction factor must be used to compensate for both when a conventional photodiode is used in a radiometric device. The correction factor is empirically determined, and the device is appropriately calibrated to the correction factor against some absolute measuring device standard.

The development of inversion layer photodiodes resulted in the availability of photodiodes which exhibit practically no recombination, i.e., have an internal quantum efficiency of essentially 100 percent. These inversion layer photodiodes were discussed in an article by T. Hansen in *Physica Scripta*, Volume 18, page 471, 1978. The result of reaching essentially 100 percent internal quantum efficiency is that it put the idea of creating an absolute radiometric device utilizing photodiodes within the realm of the feasible. It is necessary, however, to overcome the problems associated with the external quantum efficiency.

SUMMARY OF THE PRESENT INVENTION

It is therefore an object of the present invention to provide an absolute radiometric device utilizing silicon photodiodes as the light sensing element.

It is a further object of the present invention to provide an absolute radiometric device that is more economical than absolute radiometric devices of the prior art.

Briefly, the present invention includes a plurality of inversion layer photodiodes arranged in an enclosure in a configuration which minimizes the ultimate effect of the lack of perfect external quantum efficiency for the individual photodiodes. The inversion layer diodes have essentially 100 percent internal quantum efficiency, so when arranged in accordance with the present invention minimizing the effect of less than perfect external quantum efficiency, the device produces a signal comprising almost one electron-hole pair for each photon which enters the device.

The inversion layer photodiodes are arranged in a configuration such that the light which is not absorbed by a particular photodiode is reflected to the surface of another photodiode. That photodiode in turn absorbs part of the light and reflects part of the light to the surface of another photodiode. This process is continued until light is reflected to the last photodiode of the plurality of photodiodes, which is positioned so that any light which it does not absorb is reflected directly back to the photodiode from which it was reflected. The light entering the device therefore has many chances to be absorbed. Each successive reflection results in more of the light being absorbed. The output of the radiometric device is the sum of the outputs of each of the photodiodes. The preferred embodiment of the present invention utilizes four photodiodes, and if a reflective coefficient of 0.25 is assumed for the surface of the photodiodes, results in an external quantum efficiency of approximately 99.994 percent. Applications for such radiometric devices include the measurement of laser power and the use as a reference detector for other detectors.

An advantage of the present invention is that it provides an absolute radiometric device utilizing photodiodes as the light sensing element.

It is a further advantage of the present invention that it provides an absolute radiometric device that is more economical than absolute radiometric devices of the prior art.

These and other objects and advantages of the present invention will no doubt become obvious to those of ordinary skill in the art after having read the following detailed description of the preferred embodiment as illustrated in the various drawing figures.

IN THE DRAWING

FIG. 1 is a side elevational view of an absolute radiometric device in accordance with the present invention shown with the side panel of the enclosure partially removed to show interior detail;

FIG. 2 is a circuit diagram showing the electrical connections of the radiometric device in accordance with the present invention;

FIG. 3 is a diagram showing the application of the radiometric device of the present invention; and FIG. 4 is a side elevational view of an alternate embodiment of an absolute radiometric device in accordance with the present invention shown with the side panel of the enclosure partially removed to show interior detail.

DETAILED DESCRIPTION OF THE PREFERRED EMBODIMENT

Referring to FIG. 1, there is illustrated an absolute radiometric device referred to by the general reference character 10 incorporating the present invention. The absolute radiometric device 10 includes an enclosure 12 which is a container and which has a front panel 13 through which is located an aperture 14 for admitting a light beam to the interior of enclosure 12. Aperture 14 is simply a hole through the front panel member 13 of enclosure 12. Enclosure 12 is impervious to light except at aperture 14 and may be a black anodized aluminum housing.

A first inversion layer silicon photodiode 16 is affixed to a first mounting bracket 18 which is rigidly mounted on enclosure 12, on the inside thereof, opposite aperture 14, such that a light beam 20, which passes through the center of aperture 14 and is approximately perpendicular to the plane of front panel member 13 impinges on a surface 22 of photodiode 16 forming an angle of approximately 45 degrees between the direction of light beam 20 and surface 22 of photodiode 16. A first reflected light beam 24, consisting of that portion of light beam 20 which is reflected rather than absorbed by surface 22 of photodiode 16, forms an angle with light beam 20 of approximately 90 degrees.

A second inversion layer silicon photodiode 26 is affixed to a second mounting bracket 28 which is rigidly mounted on enclosure 12, on the inside thereof, such that first reflected light beam 24 impinges on a surface 30 of second photodiode 26 forming an angle of approximately 45 degrees between the direction of first reflective light beam 24 and surface 30 of second photodiode 26. A second reflecting light beam 34 consisting of that portion of the first reflected light beam 24 which is reflected rather than absorbed by surface 30 of second photodiode 26, forms an angle with first reflected light beam 24 of approximately 90 degrees, and is approximately parallel with light beam 20.

A third inversion layer silicon photodiode 36 is affixed to a third mounting bracket 38 which is rigidly mounted on enclosure 12, on the inside thereof, such that second reflected light beam 34 impinges on a surface 40 of third photodiode 36 forming an angle of approximately 45 degrees between the direction of second reflected light beam 34 and surface 40 of third photodiode 36. A third reflected light beam 44, consisting of that portion of second reflected light beam 34 which is reflected rather than absorbed by surface 40 of third photodiode 36 forms an angle with second reflected light beam 34 of approximatley 90 degrees, and is approximately parallel with first reflected light beam 24.

A fourth inversion layer silicon photodiode 46 is affixed to a fourth mounting bracket 48 which is rigidly mounted on enclosure 12, on the inside thereof, such that third reflected light beam 44 impinges on a surface 50 of fourth photodiode 46 forming an angle of 90 degrees between the direction of third reflected light beam 44 and surface 50 of fourth photodiode 46. Mounted on enclosure 12 is a coaxial connector 52 which, in conjunction with wiring not shown in FIG. 1, acts as an output means for providing external access to the electric signal produced by photodiodes 16, 26, 36 and 46.

FIG. 2 illustrates the electrical connections of the photodiodes 16, 26, 36 and 46 and of the coaxial connector 52. Each of the photodiodes 16, 26, 36 and 46 have a cathode terminal, 54, 56, 58 and 60 respectively, and an anode terminal, 62, 64, 66 and 68 respectively. Coaxial connector 52 has an internal contact 70 and a concentric outside contact 72. The cathode terminals 54, 56, 58 and 60 are all connected together electrically, and are electrically connected to said concentric outside contact 72 of the coaxial connector 52. Similarly, anodes 62, 64, 66 and 68 are all connected together electrically, and are electrically connected to said internal contact 70 of coaxial connector 52. The outside contact 72 (and therefore the cathodes 54, 56, 58 and 60) is electrically connected to enclosure 12, as is indicated by a chassis ground symbol 74 in FIG. 2.

FIG. 3 illustrates the application of radiometric device 10. The application of light beam 20 at aperture 14 of device 10 is shown, as is the connection of a coaxial cable 78 to device 10 at coaxial connector 52. A transimpedance amplifier 76 is connected to a second coaxial cable 80. Coaxial cables 78 and 80 each contain a center conductor, 82 and 84, respectively, and a concentric shield, 86 and 88, respectively. Center conductors 82 and 84 are connected together, but concentric shields 86 and 88 are isolated from each other, and are separated in voltage by the imposition of a bias voltage source 90 which may be either a battery, or a power supply such as a Hewlett Packard Model 6218A Voltage Supply. The voltage supplied by bias voltage source 90 must be matched to the characteristics of photodiodes 16, 26, 36 and 46, but is generally in the range of six to ten volts.

The operation of the absolute radiometric device 10 is initiated by application of a light beam such as light beam 20 illustrated in FIG. 1. Light beam 20 impinges on surface 22 of photodiode 16. The light of light beam 20 is then split into two parts. A part is absorbed by photodiode 16 and a part is reflected by surface 22. With currently available manufacturing techniques, it is possible to manufacture photodiodes which will absorb about 65 percent of the impinging light, and reflect the remaining 35 percent. First reflected light beam 24 therefore contains approximately 35 percent of the radiant flux of light beam 20. The impingement of first reflected light beam 24 upon the surface 30 of second photodiode 26 results in reflection of about 25 percent of first reflected light beam 24 from the surface 30, thereby forming a second reflected light beam 34. The radiant flux of second reflected light beam 34 will be 0.25 times the radiant flux of first reflected light beam 24 which is 0.25 times the radiant flux of light beam 20.

The same analysis holds as light is reflected from surfaces 40 of photodiode 36 and from surface 50 of photodiode 46. The light reflected from surface 50 impinges upon surface 40 of photodiode 36, and the portion of that light which is subsequently reflected therefrom impinges on surface 30 of photodiode 26. The portion of that light then reflected therefrom, impinges on surface 22 of photodiode 16. The portion of that light which is then reflected from surface 22 passes out through aperture 14 along the same path as incoming beam 20. Such outgoing light has been reflected seven times, once by surface 50 of photodiode 46, and twice by each of the respective surfaces 22, 30 and 40 of photodiodes 16, 26 and 36. The light which is ultimately lost through reflection, and therefore not absorbed by any of the photodiodes 16, 26, 36 and 46 is 0.25 to the seventh power, times the original quantity of light entering as light beam 20. That is the result of 25 percent of the light being reflected in each of seven successive reflections. The total unabsorbed light is therefor approximately 0.006 percent for the device of the present invention when photodiodes 16, 26, 36 and 46 each have a reflective coefficient of 0.25 for their respective surface 22, 30, 40 and 50. In order to maintain as little reflection as possible, and to avoid added difficulties with alignment the present invention does not utilize any covering such as glass over the photodiodes 16, 26, 36 and 46. A cover over aperture 14 to keep contamination from the surface 22, 30, 40 and 50 when the device 10 is not in use is therefore recommended.

Care must be taken as to the alignment of the light beam 20 entering radiometric device 10. It should be recognized that the light path through the seven reflections must end with the final reflected beam still impinging upon the surface 22 of photodiode 16. If the total length of the path of the reflected light from the point where it first leaves surface 22 until it impinges upon surface 22 the second time is six inches for a device built in accordance with the present invention, if the light beam 20 is always directed at the exact center of surface 22 of photodiode 16, and if we assume that the internal alignment of the photodiodes 16, 26, 36 and 46 is perfect, then for a device with a surface area of one square centimeter for each of the photodiodes 16, 26, 36 and 46, the allowable deviation in the angle of the entering light beam 20 from perfect alignment is less than two degrees. Thus the total acceptance angle is less than four degrees. The total acceptance angle of light can be increased to about seven and one-half degrees if the length of the path of the reflected light is held to less than three inches.

For proper functioning, the photodiodes 16, 26, 36 and 46 are provided with a reverse bias voltage by bias voltage source 90. The minimum voltage required is dependent on the photodiodes utilized, but can be experimentally determined. Measuring the output current from coaxial connector 52 with no light and with a fixed intensity light beam provides a pair of values representing such no light and fixed intensity light conditions. Even though the actual intensity of the light beam is not initially known, the differences between the currents at the no light and fixed intensity light conditions at each of several bias voltages can provide the data necessary to determine the appropriate bias voltage. Such a series of measurements will yield, at low bias voltages, differences between the lighted and unlighted conditions which increase as bias voltage increases. When there is sufficient bias voltage, typically somewhere between six and ten volts, further increases in bias voltage do not increase the difference in current between the lighted and unlighted conditions. All the photodiodes 16, 26, 36 and 46 see some of the light, and together they see essentially all of the light (except for the small portion ultimately reflected back toward aperture 14). The photodiodes are therefore connected in parallel so that the current available at coaxial connector 52 will be the sum of the currents resulting from all of the absorbed light.

For light in the visible spectrum and the near infrared region, for each photon which strikes an inversion layer silicon photodiode, one electron will be released. The energy in each photon is represented by the equation $$Q = (hc)/(\lambda \eta)$$

where h is Plank's constant, c is the speed of light, $\lambda$ is the wavelength of the radiation, and $\eta$ is the refractive index of the media through which the light is traveling, in this case air. The responsivity of the radiometric device 10 of the present invention is represented as $R_m$ and is defined by the equation relating the charge released by each photon absorbed, to the energy contained in each such photon. Since one electron of charge e is released for each photon of energy, the equation for the responsivity is $$R_m = \frac{e}{\frac{hc}{\lambda \eta}} = \frac{\lambda}{\frac{hc}{e\eta}}$$

Where
$e = 1.6022 \times 10^{-19}$ coulombs,
$h = 6.626 \times 10^{-34}$ joule-seconds
$c = 2.9979 \times 10^{17}$ nanometers per second, and
$\eta = 1.00028$, then $$R_m = \lambda / 1239.5 \text{ amperes per watt}$$

Thus, the responsivity of radiometric device 10 is dependent only on the wavelength of the incident radiation, and on physical constants. The output $R_m$ of radiometric device 10 being in amperes per watt of input light, can be measured with the aid of transimpedance amplifier 76.

FIG. 4 illustrates an alternate embodiment of an absolute radiometric device designated by the general reference character 100 and incorporating the present invention. An enclosure 102 contains a plurality of inversion layer silicon photodiodes 104, each fixed to one of a plurality of mounting brackets 106 which are each rigidly attached to encloser 102. Aperture 108 is a hole through enclosure 102 providing the only access for light to the inside of enclosure 102. The radiometric device 100 can be built with any number of photodiodes 104, limited only by the fact that the larger the number of photodiodes 104, the longer the light path, and as the light path becomes longer, the acceptance angle for the beam of light to be measured becomes smaller.

The path which the measured radiation in radiometric device 100 travels is illustrated by a plurality of light paths 110. As in the description of the previously described embodiment, at the surface of each photodiode 106 a portion of the light will be absorbed and a portion reflected. In radiometric device 100 the photodiodes 104 are arranged in two rows such that the reflected portion of the light beam at each subsequent reflection is reflected to the photodiode next in line in the opposite row. The last photodiode 104 in the series is positioned such that it reflects light directly back at the photodiode 104 from which the light came, thus causing the light to retrace its path back down the plurality of light paths 110.

The photodiodes 104 are connected in a parallel circuit configuration as in the previously described embodiment, and are connected to coaxial connector 112. The biasing and connections illustrated in FIG. 3 and discussed above, apply equally to the radiometric device 100 as to the radiometric device 10.

The preferred embodiments described herein have all of the light paths in a single plane. It should be recognized, however, that the reflections may be made in three dimensional space to overcome polarization effects.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A radiometric detector comprising:
   an enclosure having means through which a light beam can enter said enclosure;
   a plurality of light sensitive devices which produce electrical signals responsive to impinging light, the devices being positioned within the interior of the enclosure in a manner allowing said light beam to impinge upon a surface of one of said devices and the light reflected from said surface of one of said devices to impinge on a surface of another of said devices, with any of such light reflected therefrom impinging on still another of said devices with such arrangement similarly established for each of said devices except for the last in the plurality of devices to be impinged by such reflected light, said last device being positioned such that light reflected by it is reflected back in the direction of said impinging light; and
   an output means for providing external access to an electrical signal produced by said devices.

2. A radiometric detector of claim 1 wherein,
   the light sensitive devices are inversion layer photodiodes.

3. The radiometric detector of claim 2 wherein,
   the photodiodes are all electrically connected together in parallel and the common connection is connected to the output means.

4. The radiometric detector of claim 3 wherein,
   the enclosure includes an aperture through which a light beam can enter and the interior surface is black.

5. A radiometric detector comprising:
   an enclosure having means through which a light beam can enter said enclosure;
   a plurality of four inversion layer photodiodes positioned within the interior of said enclosure, in a manner allowing said light beam to impinge upon a surface of a first of said photodiodes and the light reflected from said surface to impinge on a surface of a second of said photodiodes, and the light reflected from said surface of said second photodiode to impinge on a surface of a third of said photodiodes, and the light reflected from said surface of said third photodiode to impinge on a surface of a fourth of said photodiodes, and the light reflected from said surface of said fourth photodiode to reflect back to said surface of said third photodiode; and
   an output means for providing external access to an electric signal produced by said plurality of photodiodes.

6. The radiometric detector of claim 5 wherein,
   the photodiodes are all electrically connected together in parallel and the common connection is connected to the output means.

7. The radiometric detector of claim 5 wherein,
   the enclosure includes an aperture through which a light beam can enter and the interior surface is black.

8. A radiometric detector comprising, in combination:
   an enclosure having an aperture through which a light beam can enter said enclosure;
   a first inversion layer photodiode attached to the interior of the enclosure in a position to intercept a light beam entering said enclosure at an angle of approximately 45° to the surface of the first photodiode, the first photodiode being adapted to reflect a portion of said light beam and establish a second light beam having a direction approximately perpendicular to said light beam impinging on said surface of said first photodiode;
   a second inversion layer photodiode attached to the interior of the enclosure in a position to intercept said second light beam at an angle of approximately 45° to the surface of the second photodiode, the second photodiode being adapted to reflect a portion of said second light beam and establish a third light beam having a direction approximately perpendicular to said second light beam;
   a third inversion layer photodiode attached to the interior of the enclosure in a position to intercept said third light beam at an angle of approximately 45° to the surface of said third photodiode, the third photodiode being adapted to reflect a portion of said third light beam and establish a fourth light beam having a direction approximately perpendicular to said third light beam;
   a fourth inversion layer photodiode attached to the interior of the enclosure in a position to intercept said fourth light beam with said fourth light beam approximately perpendicular to the surface of said fourth photodiode, the fourth photodiode being adapted to reflect a portion of said fourth light beam back toward said surface of said third photodiode and any portion thereof reflected by said surface of said third photodiode is reflected toward said surface of said second photodiode where any portion thereof reflected by said surface of said second photodiode is reflected toward said surface of said first photodiode; and
   wherein said photodiodes are provided with electrical connections connected in a parallel circuit, and an output means electrically connected to said parallel circuit of said photodiodes.

* * * * *